Patented Apr. 16, 1946

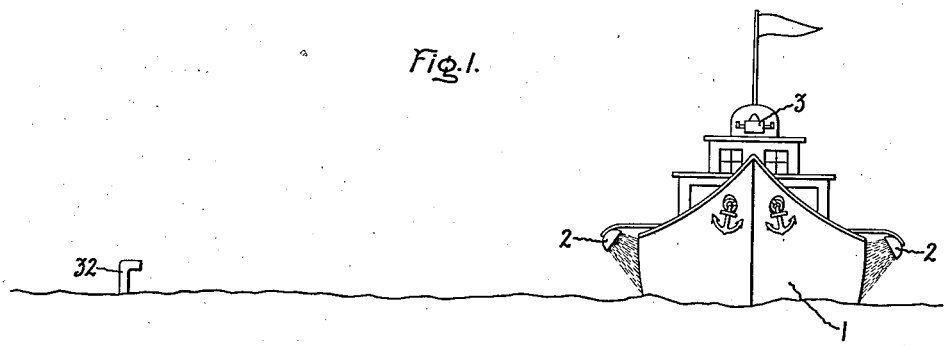
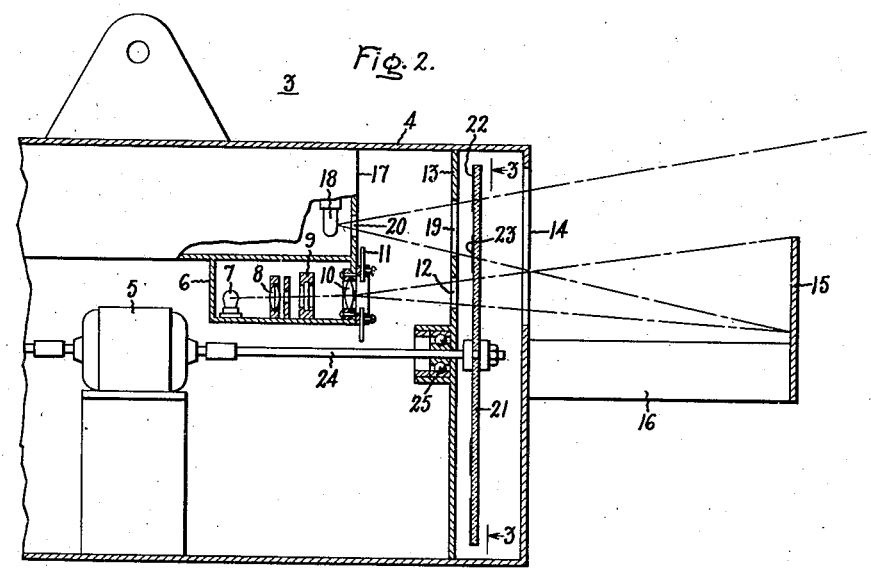
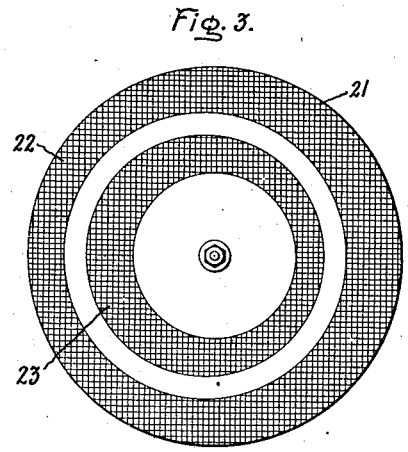
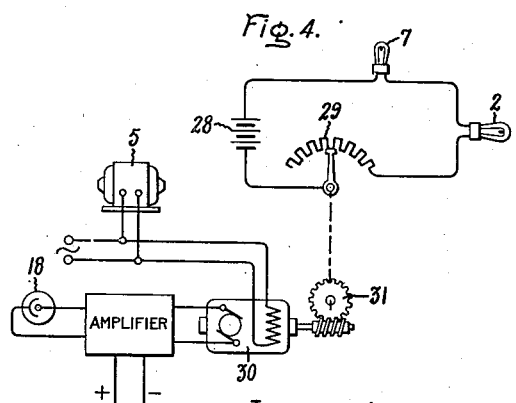
Inventor:
William D. Cockrell,
by Harry E. Dunham
His Attorney.

2,398,620

UNITED STATES PATENT OFFICE 2,398,620

APPARATUS FOR REDUCING THE VISIBILITY OF AN OBJECT SILHOUETTED AGAINST THE SKY

William D. Cockrell, Schenectady, N. Y., assignor to General Electric Company, a corporation of New York Application June 5, 1944, Serial No. 538,873

4 Claims. (Cl. 114—15)

My invention relates to apparatus for reducing the visibility of an object silhouetted against the sky and its object is to provide an improved form of such apparatus which is simple in construction, reliable in operation and inexpensive to manufacture.

My invention will be better understood from the following description taken in connection with the accompanying drawing and its scope will be pointed out in the appended claims.

Referring to the drawing, Fig. 1 shows an object which is provided with apparatus for reducing its visibility; Fig. 2 is a cross sectional view of a part of said apparatus; Fig. 3 shows a detail thereof; and Fig. 4 is a circuit diagram.

As is well known an object silhouetted against a bright sky usually appears dark since the side of the object toward the observer is darker than the sky. In accordance with my invention that side of the object is artificially illuminated to such an extent that it corresponds in appearance with the sky and as the natural light of the sky varies the artificial illumination of the object is automatically varied so as to preserve the aforesaid correspondence in the appearance of the sky and the object.

As an example of an object silhouetted against the sky whose visibility is to be reduced I have chosen to show the ship 1 having the flood lamps 2 by which its sides are illuminated and having mounted thereon apparatus represented at 3 for controlling said lamps. That apparatus as shown in Fig. 2 comprises the horizontal casing 4 arranged to hang horizontally and containing duplicate mechanisms in the two ends thereof each including a rotating member driven by the common synchronous motor 5. Since the mechanisms in the two ends of the casing are duplicates but one has been shown and this one will now be described. Mounted within an interior compartment 6 in said casing is a light projecting system comprising the lamp 7, the apertured condensing lens 8, the filter 9, the lens 10 and the adjustable aperture 11. The light projected by this system passes outward through the window 12 in the partition 13 and the window 14 in the end of the casing 4 to illuminate the target 15 which is supported from the casing 4 by the bracket 16 and is painted like the side of the ship. Within another interior compartment 17 is the photoelectric device 18 which is arranged to receive light through the window 19 in the partition 13, the window 14 in the end of the casing and the window 20 in the compartment 17, the alinement of the windows being such that the photoelectric device may receive light both from the sky and from the target. Arranged to rotate between the windows 14 and 19 is the transparent disk 21 which functions as a shutter and is coated with an opaque material such as paint, to form the two opaque areas 22 and 23 leaving a clear eccentric ring therebetween. The disk is driven by the synchronous motor 5 through the shaft 24 having the bearing 25 in the partition 13. As the disk rotates it limits the light reaching the photoelectric device alternately to that coming from the sky and that reflected by the target 15. Inasmuch as the apparatus 3 is in a position where it is exposed to the weather the window 14 is not provided with any transparent cover which might become covered with condensation, snow or sleet but rather remains open at all times. The disk 21 by reason of its rapid rotation keeps itself free of any such accumulation of moisture and by reason of its proximity to the partition 13 prevents the entrance of snow and sleet through the window 19.

The flood lamps 2 and the projection lamp 7 are connected to be varied in intensity simultaneously such being illustrated by way of example by Fig. 4 where they are shown connected in series with the battery 28 through the rheostat 29. Mechanism of a well known form, such for example as that disclosed in the Hardy Patent 1,806,199, May 19, 1931, is employed to control the rheostat 29 in accordance with the output impulses of the photoelectric device as it alternately views the sky and the target. As shown by Fig. 1 the rheostat is varied to increase or decrease the brilliancy of both lamps 2 and 7 by the motor 30 operating through the reduction gear 31. This motor corresponds with the motor $M^2$ of the above-mentioned patent and the motor 5 corresponds with the motor 24 thereof. If the sky and the target happen to be of the same brightness there will be no perceptible impulses in the output of the device and hence the motor 30 which drives the rheostat will not turn. If, on the other hand, the sky is brighter than the target the motor will rotate in a direction to decrease the resistance of the rheostat thus increasing the brilliance of the lamps 2 and 7 until an equality is established between the sky and the target. Likewise if the target appears brighter than the sky the brightness of the lamps is reduced until equality is established between the sky and the target. Since the target and the ship are painted alike and since the flood lamps 2 and the projection lamp 7 are controlled by the same rheostat it will be seen that the visibility of the ship against the sky as seen for example from an object indicated at 32 is greatly reduced and is so maintained notwithstanding changes in the sky illumination.

What I claim as new and desire to secure by Letters Patent in the United States is:

1. Apparatus for reducing the visibility of an object silhouetted against the sky comprising means for illuminating the side of the object toward the observer, a target associated with the object, means for illuminating said target, means for simultaneously varying the object illuminating means and the target illuminating means, a photoelectric device, means for causing said device alternately to view said target and the sky against which said object may be silhouetted and means responsive to a difference in the output of said device as the device is caused alternately to view said target and said sky for controlling said varying means.

2. Apparatus for reducing the visibility of an object silhouetted against the sky comprising means for illuminating the side of the object toward the observer, a target associated with the object, means for supporting said target in a position to receive natural illumination, means including a lamp for additionally illuminating said target, means operative simultaneously to vary in the same sense said object illuminating means and said lamp, a photoelectric device, motor driven means for causing said device alternately to view said target and the sky against which the object may be silhouetted and means responsive to recurring variations in the output of said device as it alternately views said target and said sky for controlling said varying means.

3. Apparatus for reducing the visibility of a ship silhouetted against the sky comprising lamps carried by the ship for illuminating the side thereof toward the observer, a target carried by the ship in an exposed position, means including a lamp for projecting light on said target, means for simultaneously varying in the same sense the illuminating effect of said lamps and said lamp, a photoelectric device, motor driven apparatus arranged to admit light to said device alternately from said target and said sky, and means responsive to recurring variations in the output of said device for controlling said simultaneously varying means whereby the illumination of said ship is rendered substantially equal to the illumination of said sky.

4. In apparatus of the character described adapted for use where it is exposed to the weather, the combination of an enclosing casing having one side thereof provided with a light aperture, photoelectric device in said casing arranged opposite said aperture, a target associated with and spaced from said casing, means for illuminating said target and a motor-driven disk mounted to rotate in front of and adjacent to said side, said disk having an eccentric light slit therein positioned to pass light through said aperture to said device alternately in a path extending from said target and in a path extending at one side thereof.

WILLIAM D. COCKRELL.